Oct. 11, 1949.                R. J. RUBLE                2,484,249
                        PREPARATION OF GAS MIXTURES
Filed March 19, 1947                                  2 Sheets-Sheet 1
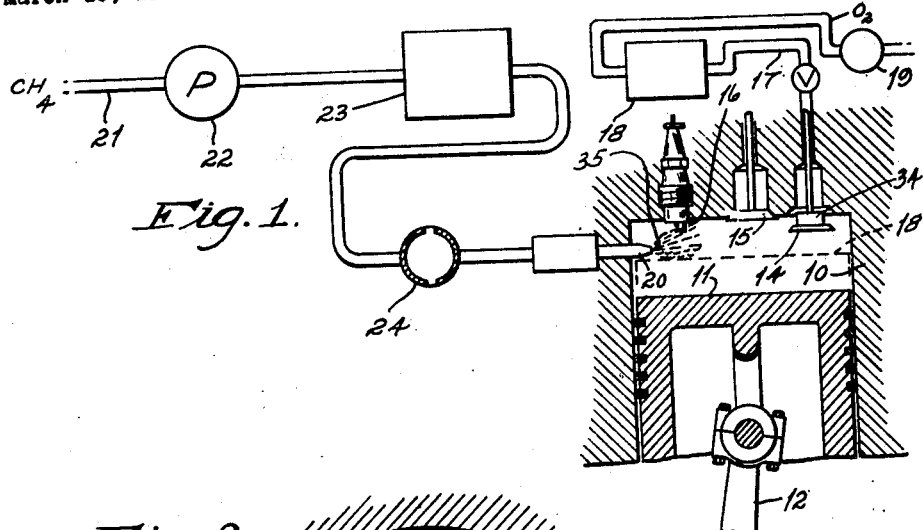
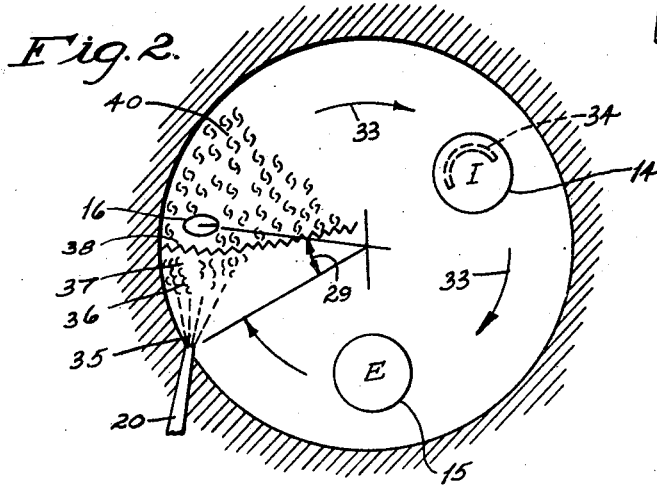
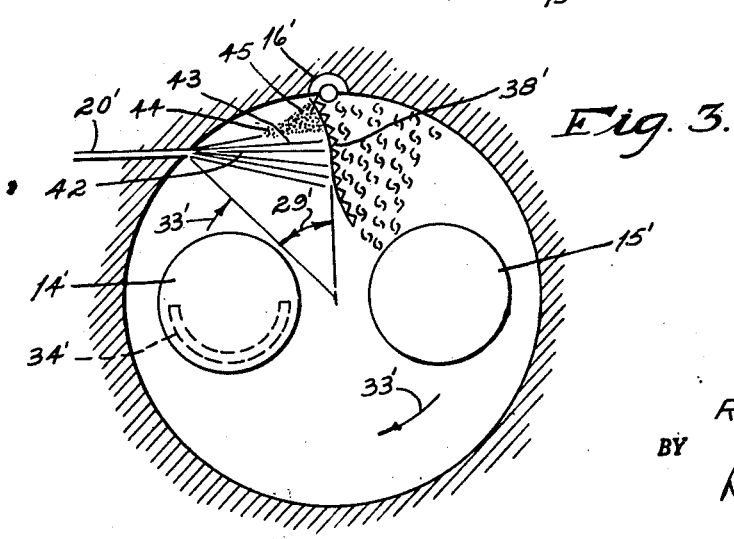
INVENTOR.
RAYMOND J. RUBLE
BY
ATTORNEY Oct. 11, 1949.  R. J. RUBLE  2,484,249
PREPARATION OF GAS MIXTURES
Filed March 19, 1947  2 Sheets-Sheet 2
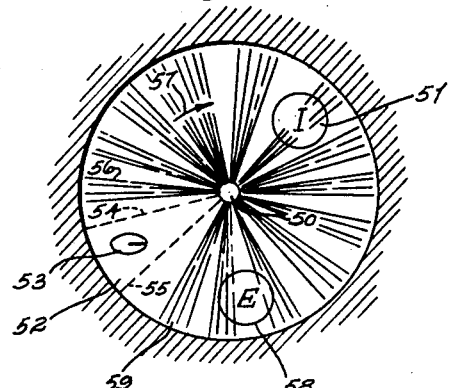
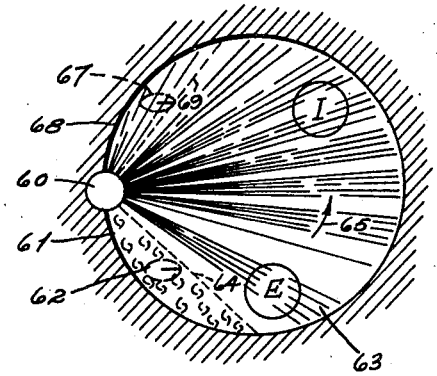
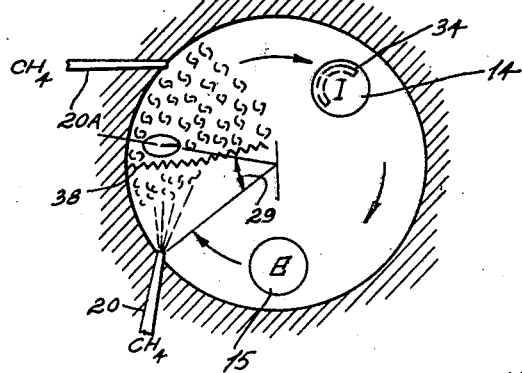
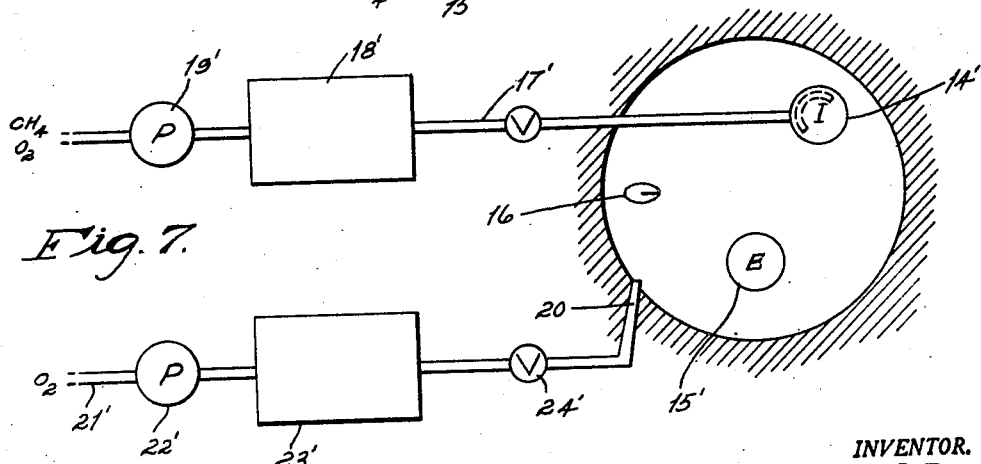
INVENTOR.
RAYMOND J. RUBLE
BY
ATTORNEY Patented Oct. 11, 1949

2,484,249

UNITED STATES PATENT OFFICE 2,484,249

PREPARATION OF GAS MIXTURES

Raymond J. Ruble, Beacon, N. Y., assignor to Texaco Development Corporation, New York, N. Y., a corporation of Delaware Application March 19, 1947, Serial No. 735,597

3 Claims. (Cl. 48—212)

This invention relates to the preparation of gas mixtures including carbon monoxide and hydrogen for the synthesis of hydrocarbons, oxygenated compounds and the like, and more particularly to the preparation of such gas mixtures in an engine of the internal combustion type.

While attempts have been made heretofore to prepare such gas mixtures in internal combustion engines, difficulties such as undesirable preignition have been encountered. In addition, it has been found difficult to secure the desired ratio of the carbon monoxide and hydrogen in the product gas for particular uses such as the synthesis of hydrocarbons, oxygenated compounds and the like. For proper functioning of the engines, it has been found that the ratio of the feed constituents and accordingly the yield and ratio of constituents in the product gas, must be confined to a rather limited range. To avoid knock, a very rich mixture has been required. If too rich a mixture is used, considerable trouble is encountered with ignition by reason of spark plug failures with the result that considerable feed material is found in the product gas. Where natural gas, consisting chiefly of methane, and oxygen have been used in the feed, it has been found necessary in some cases to pass the exhaust gas through a medium such as copper filings, to remove the oxygen. Otherwise, explosions of the product gas may occur. The presence of feed constituents such as oxygen in the product gas is also objectionable in the synthesis of hydrocarbons and related compounds because of the undesirable effect of the oxygen on the catalyst.

The carbureting of feed constituents such as natural gas and oxygen for use in an internal combustion engine has also proven a difficult problem because of the explosive character of the mixture and the attendant danger of preignition and flashbacks.

In overcoming the aforesaid disadvantages, it is an object of the present invention to provide a novel process for preparing synthesis gas, consisting principally of carbon monoxide and hydrogen, wherein the initial reactants such as hydrocarbon and oxygen are caused to react in the combustion chamber of an internal combustion engine without knocking or preignition and under controlled conditions leading to reactions at a high energy level.

Another object of the invention is the provision of a novel process for preparing synthesis gas by use of an internal combustion engine wherein the ratio of the feed constituents can be readily varied, and other constituents added thereto, if desired, to produce product gases in satisfactory yield and having the constituents thereof in desired proportions for the synthesis of hydrocarbons and related compounds, or other uses.

Still another object of the invention is the provision of a novel process for preparing synthesis gas in an internal combustion engine wherein there is no interference with the ignition and substantially no mixing of unreacted feed constituents with the product gases.

Another object of the invention is to provide a novel process for efficiently producing synthesis gas in an internal combustion engine coupled with the production of power by the engine which is available for work in other phases of the gas generation or the synthesizing process which may follow thereafter.

Still another object is the provision of a novel process for preparing synthesis gas wherein the initial reactants such as a hydrocarbon and oxygen are caused to react to form primary oxidation products, the latter and additional hydrocarbon further reacting to form synthesis gas, the two reaction phases taking place in the combustion chamber of an internal combustion engine.

A further object is to provide a novel process for preparing synthesis gas by means of an internal combustion engine wherein a large range of different types of reactants can be used in combination with an oxygen-containing gas for the efficient production of a good grade of synthesis gas having its constituents in the desired proportions.

Other objects and advantages of the invention will appear from the following description and claims taken in connection with the attached drawing, wherein:

Figure 1 is a diagrammatic view of an engine cylinder with the reactant feed and ignition systems therefor.

Figure 2 is a horizontal diagrammatic view looking upwardly in the cylinder of Figure 1, showing the relative locations of the spark plug and injection nozzle, and the nature of the reaction taking place in the combustion space.

Figures 3, 4 and 5 are horizontal views similar to Figure 2 but of modifications thereof.

Figure 6 is a horizontal view similar to Figure 2 wherein one of the reactants is introduced at different stages in the engine cycle.

Figure 7 is a diagrammatic view showing a process wherein one reactant is divided, a portion fed with the other reactant and the remainder by injection.

In brief, the present invention is directed to processes for the preparation of product gases, consisting chiefly of carbon monoxide and hydrogen in different proportions, by an internal combustion engine embodying the principles of operation disclosed in the co-pending application of Everett M. Barber, Serial No. 513,232, filed December 7, 1943 and entitled Internal combustion engine, now abandoned. In the processes involved herein, the reaction of the feed constituents is accomplished in an engine cylinder in such manner that knocking or preignition does not occur, irrespective of the octane number or cetane number of the reactants used, the volatility of the reactants over a relatively broad range, or the compresion ratio; and the proportions of reactants employed are capable of adjustment to secure a final product gas containing carbon monoxide and hydrogen in the relation desired.

In brief, this is accomplished by the separate feeds of the reactants, by preventing one reactant from mixing with another reactant throughout the combustion space, and by causing the reactants to mix in a manner whereby a combustible mixture is formed in a predetermined zone at predetermined times by controlled increments so that the relative advance of the reaction or flame front, as it might be described, traps and compresses only an incombustible reactant or an incombustible mixture of reactants. This is in contrast to the normal method of operating an internal combustion engine wherein a combustible mixture is prepared by carburetion and the combustible mixture fed to the combustion space whereby on ignition, which may be premature, the advance of the flame front and attendant expansion of the gases tends to compress a portion of the combustible mixture before it is reached by the flame front to an extent that under the conditions in the combustion space, that portion of the combustible mixture is caused to spontaneously ignite with resultant knock.

In the preferred embodiment of the invention, one of the reactants such as an oxygen-containing gas, preferably containing 90–99 per cent oxygen, is introduced into the combustion chamber of a cylinder by the usual intake valve and compressed on the compression stroke. Another reactant, for instance, a hydrocarbon such as natural gas, consisting chiefly of methane, is injected into the compressed oxygen-containing gas at a point of piston travel under conditions such that a combustible oxygen-hydrocarbon mixture is formed at the point of ignition and closely adjacent the point of injection of the hydrocarbon. The amount, time, and direction of hydrocarbon injection at this stage from injection to ignition is so controlled that the hydrocarbon mixes only with a localized portion of the oxygen-containing gas in the combustion space. This first increment of injected hydrocarbon with a localized portion of the oxygen-containing gas forms a localized combustible mixture which is immediately ignited by a spark or other suitable means thereby establishing a reaction front. If preignition occurs, it can only be at this point which is so close to the desired point of ignition that no harm is done. The injection of the hydrocarbon is continued during the balance of the injection period into a narrow zone or zones of the combusiton chamber immediately in advance of the reaction front in its direction of burning.

The net result is that any increment of combustible mixture undergoing combustion within the cylinder is caused to react so rapidly after its initial mixture that it is at all times cushioned or insulated by a mass of incombustible gas, either the oxygen-containing gas, the products of the reaction or both. Consequently, the possibility of the formation of highly compressed and heated end gases in other zones of the combustion chamber which are susceptible to spontaneous ignition with consequent knock is substantially eliminated.

Referring to Figure 1, an engine cylinder is indicated at 10 with piston 11 and connecting rod 12, the latter extending to the usual crank shaft, not shown. The cylinder head is equipped with suitable ports controlled by an intake valve 14 and an exhaust valve 15, and an opening receiving a spark plug 16 connected to any conventional ignition system synchronized with the movement of piston 11 in well known manner. Communicating with intake valve 14 is an oxygen-containing gas intake line 17, preferably connected through a preheater 18 with a pump or compressor 19 capable of compressing the gas to a pressure such that the gas can be charged to the cylinder at a pressure as high as 100 pounds per square inch gauge. The port controlled by exhaust valve 15 is connected to a synthesis reactor of well known type or to suitable storage facilities for the product gas.

A hydrocarbon injection nozzle 20 is mounted in a suitable opening in the cylinder head and, as shown in Figure 2, is arranged to discharge in a generally tangential direction into the combustion space of the cylinder. The hydrocarbon is supplied from a suitable source by a line 21 leading through a pump or compressor 22, a preheater 23 and a control valve 24 of the rotary or other suitable type. Pump 22 is designed to force the hydrocarbon into preheater 23, which also serves as an accumulator tank or, if desired, a separate tank may be provided for this purpose, under sufficient pressure such that the hydrocarbon, if in liquid form, can be injected at a pressure of about 2500 pounds per square inch gauge, or if in gaseous form, can be injected into the cylinder at a pressure of about 2000 pounds per square inch gauge. Dependent upon whether the hydrocarbon normally exists in the liquid or gaseous stage, obvious modifications can be made in the system. The system disclosed is of particular advantage in multicylinder engines, since the separate cylinders can be supplied through individual feed lines running from combined preheater and accumulator 23.

While oxygen-containing gas is discussed in the present example as being taken in through the intake valve and the hydrocarbon through the injection nozzle, it is to be understood that the two reactants may be reversed and the hydrocarbon fed through the intake valve and the oxygen-containing gas through the injection nozzle. It is also to be understood that the hydrocarbon may be in a gaseous phase or initially in a liquid phase capable of being vaporized under the conditions existing in the cylinder. In lieu of a hydrocarbon, solid carbon-containing materials such as powdered coal, coke, lignite, etc. may be used, the term "carbonaceous material" being used herein to designate hydrocarbons in gas, liquid or solid phase as well as other carbon-containing materials such as coal and coke capable of reacting in the desired manner with oxygen to produce the gas mixtures desired.

Valve 24 functions as a means for regulating the quantity of hydrocarbon and the time of its injection relative to the engine cycle. Obviously, valves of other types may be employed, it being only necessary that the action of the valve be synchronized with the movement of piston 11 in well known manner.

Referring to Figure 2, intake valve 14 is preferably equipped with a shroud-like member 34 so positioned as to direct the incoming oxygen-containing gas in a tangential direction to produce a swirling movement of the gas within the combustion space as indicated by arrows 33. In operation, the gas is charged to the cylinder on the suction stroke of piston 11 and consequently compressed on the compression stroke of the piston, the swirling movement of the gas being continued. It is well established that a high velocity of swirl can be imparted, such that the R. P. M. of the gas swirl at the end of the compression stroke is several times the R. P. M. of the engine.

Near and generally somewhat before the piston reaches top dead center as indicated by dotted line 18 (Fig. 1), hydrocarbon is injected from nozzle 20 into the swirling oxygen-containing gas in a generally tangential direction relative to the combustion space of the cylinder and preferably in a somewhat upward direction as shown in Fig. 1 to bring the edge of the injection pattern closely adjacent the electrodes of spark plug 16. It is to be understood that the upwardly inclined direction of the injection pattern is particularly applicable to this particular embodiment of the invention where a relatively flat injection pattern is used and the electrodes of the spark plug are near the top of the combustion space adjacent the injection nozzle tip. However, where the injection pattern is of the cone-shaped type or where the spark plug enters the combustion chamber with the electrodes closer the nozzle tip, it is not necessary that the spray be upwardly inclined. In such case, the injection pattern may be in a substantially horizontal plane or inclined downwardly in some cases. Preferably, the hydrocarbon introduced is highly atomized and, if in the form of a liquid, is at such temperature and pressure that it flash vaporizes or forms vapor very rapidly, and the resulting hydrocarbon vapor is intimately mixed with the swirling oxygen-containing gas to form a combustible mixture closely adjacent and within a relatively short travel of the hydrocarbon from nozzle 20 and about the time that the resulting combustible hydrocarbon-oxygen mixture reaches spark plug 16.

As viewed in Fig. 2, the injection pattern from nozzle 20 is preferably fan-shaped, and as viewed in Fig. 1, is preferably flat to generally conform to the shape of the adjacent portion of the combustion space so as to uniformly impregnate the swirling gas as the latter passes slightly beyond the point of hydrocarbon injection while simultaneously avoiding objectionable impingement of the hydrocarbon on the cylinder wall and piston. The factor of possible impingement is particularly important where the hydrocarbon is in the liquid phase initially and may tend to return to such liquid phase on contact with the cylinder wall and piston.

As soon as discharged from the injection nozzle in its highly divided form as indicated at 35, the hydrocarbon begins to mix with the swirling gas to form the ultimate combustible mixture. As the injected hydrocarbon moves outwardly to the position indicated at 36, the swirling gas tends to deflect the hydrocarbon vapor toward the cylinder wall as generally indicated at 37, thereby facilitating the proper mixture of hydrocarbon with the swirling gas and producing a uniform mixture. Zones indicated by 35 and 36, therefore, can be said to constitute the region of impregnation of the oxygen-containing gas and the region of formation of a combustible oxygen-hydrocarbon mixture.

Just as, or very shortly after the first increment of injected hydrocarbon reaches the area of spark plug 16 (by which time the combustible oxygen-hydrocarbon mixture has been formed), a spark at the electrodes of plug 16 ignites the mixture, thereby establishing a reaction front as indicated by line 38. As shown in Figures 1 and 2, the position of plug 16 is so correlated with the position of nozzle 20, and the injection pattern produced by that nozzle, that the plug electrodes are within the increment of the combustible oxygen-hydrocarbon mixture but out of contact with unmixed hydrocarbon whereby ignition of this first increment of injected hydrocarbon is insured. The exothermic heat of reaction causes rapid heat expansion of the mixture and burning products whereby reaction front 38 assumes a shape such as that shown in Fig. 2.

Spark plug 16 is spaced from nozzle 20 a sufficient distance to permit the formation of the increment of combustible oxygen-hydrocarbon mixture during the travel of the hydrocarbon, the plug at the same time being sufficiently close to nozzle 20 to prevent the accumulation within the combustion zone or space of any substantial amount of combustible mixture prior to ignition. In the particular arrangement shown, employing a cylinder having a bore diameter of 3¼ inches, good results can be secured with an included angle 29 of about 30–90° and preferably about 30–45° between the radii passing through plug 16 and the tip of nozzle 20, respectively. It is to be understood that the injection pattern, the fuel intensity of the jet, and the velocity of the swirling gas are altered and correlated for the different spacings for the plug and nozzle tip to obtain the desired operation. In general, it can be stated that the included angle 29 should be greater than about 20° and less than 135°. In this manner, the oxygen-hydrocarbon mixture is ignited almost as soon as it is formed, eliminating possible preignition, and before an opportunity is afforded for the hydrocarbon to mix with the oxygen-containing gas throughout any substantial extent of the combustion space. The net result is that combustible mixture is produced only within a localized combustion space and that space is adjacent plug 16. Further, this mixture is surrounded and cushioned by oxygen-containing gas on one side and by incombustible hydrocarbon on the other. Thus, at the beginning of ignition, there is no other combustible mixture within the combustion space. The established reaction front 38 tends to travel toward nozzle 20. However, the high swirling movement of the oxygen-containing gas and other gases in the combustion space tends to counteract such relative movement of the reaction front with respect to the cylinder wall, so that the reaction front remains relatively stationary, that is, in a fixed location with respect to the cylinder wall, fuel nozzle and spark plug.

In actual practice the start of hydrocarbon injection through nozzle 20 may be between 0° and 75° before top dead center; the degree of advance being usually set on the best compromise between mean effective pressure and reasonable maximum pressures. The spark advance is synchronized with the injection in a manner hereinafter discussed in greater detail so that a spark of igniting intensity is present at the plug when the first increment of combustion mixture reaches the plug. It is to be understood that the above advance range applies to particular conditions of engine size and construction, for example, a 3¼ inch bore engine having the construction shown, and the settings may be different for other engine designs and constructions.

An important feature resides in the control of the quantity of reactant injected before ignition and particularly its confinement to a narrow zone of the combustible space, so that the injected reactant mixes with only a localized portion of the gas therein before combustion of the mixture begins. Another important consideration resides in the positioning of the spark plug with reference to the injection nozzle and the synchronization of the spark with respect to the injection so that reaction is initiated in the localized portion of combustible gas mixture as soon after the beginning of injection as the first combustible increment reaches the spark plug.

If too much hydrocarbon is injected before the spark ignites the combustible mixture, then there is a possibility of preignition. Further, the mixture disseminates too widely throughout the combustion space, and there is such a large volume of combustible mixture present therein at the time of ignition that a substantial period of time is required for the reaction front to progress across this initially-formed combustible zone. This approaches the combustion conditions characteristic of conventional Otto cycle operation, wherein it is possible for the advance flame front to highly heat and compress unburned mixture to the point of spontaneous ignition before the flame front advances from the ignition means to the zone of the aforesaid combustible mixture.

On the other hand, if the spark occurs too soon and is not maintained, then there is no opportunity for the formation of a combustible mixture during the time the spark is on. Consequently, the first increment of combustible mixture will not be ignited and additional hydrocarbon will be injected and combustible mixture accumulated and compressed until spontaneous ignition occurs with a high cetane number (low octane number) hydrocarbon, or the charge misfires entirely with a low cetane number hydrocarbon. Such spontaneous ignition simulates operation on the Diesel cycle and produces a Diesel thump or knock, which operation is not independent of the fuel quality. These objectionable conditions are avoided in the present invention without regard to fuel quality by insuring proper ignition control and by control of the fuel injection and its synchronization with the spark advance in accordance with the relative positioning of the injection nozzle and spark plug, the diameter of the cylinder, the velocity of gas swirl, and the injection pattern. As described hereinafter, a multiple spark or continuous spark of definite duration may advantageously be employed to obviate the necessity for the critical synchronization with the spark advance as is required with an instantaneous spark.

During the continuance of that portion of the compression or combustion stroke or both, which falls within the period of hydrocarbon injection, additional hydrocarbon is injected toward reaction front 38 and is mixed with fresh quantities of the swirling gas to form a combustible mixture that is ignited and caused to react as it reaches the reaction front. It will be noted that combustion of the additional increment of combustible mixture takes place almost as rapidly as such increments are formed, and that no opportunity is afforded for the hydrocarbon to become disseminated too widely within the combustion space with possible spontaneous ignition and the undesirable formation of carbon. The first portions of the combustible mixture which are rapidly burned at the reaction front become substantially incombustible exhaust gases which continue the swirling movement around the cylinder as indicated at 40, Fig. 2.

In this method of operation, another important consideration is the proper correlation of directional gas movement or swirl with the rate of hydrocarbon injection and the injection pattern, so as to uniformly impregnate with hydrocarbon the entire volume of oxygen-containing gas.

This requires a directed or controlled movement of the oxygen-containing gas within the combustion space passing the locus of injection, which movement is of a sufficiently high velocity that a complete rotation of contents of the combustion space can occur within the normal period of hydrocarbon injection for full power of about 30–90 crank angle degrees.

The desired directional flow of oxygen-containing gas can be conveniently secured by utilizing a disc-shaped combustion chamber equipped with means for producing induction swirl of the gas as illustrated. While the piston and cylinder head are shown in Fig. 1 as being substantially flat, one or both may be dished or crowned. It is to be understood that the term "disc-shaped" is used in a broad sense as meaning a combustion space which is generally circular in cross section as defined by a geometrical figure spinning on its axis but which may have various configurations in vertical section due to dishing or crowning of the piston or cylinder head or both so long as the combustion space is devoid of irregular shape such as that resulting from communication of the main power cylinder combustion space with an auxiliary combustion chamber.

An important feature of the present invention resides in the fact that the no-knock combustion or reaction is accomplished in the power cylinder combustion space, and the provision of an ante-chamber or auxiliary combustion space, or a separate compressor cylinder having open communication with the main combustion space within the power cylinder is rendered unnecessary.

The desired velocity of induction gas swirl is secured by directing the oxygen-containing gas on the suction stroke of the piston through a shrouded intake valve wherein the shroud extends about 180° around the valve (Fig. 2), the ends of the shroud being positioned substantially on a radius of the combustion space. With any particular injection rate and injection pattern for a given location of the spark plug, the shrouding of the valve is found to be critical within easily determined limits. For example, either increasing or decreasing the circumferential extent of the shroud about the valve more than about 10° for a particular set up also causes knocking. It will be appreciated that such changes in the shroud alter the velocity of gas swirl to such an extent that the same rate of hydrocarbon injection with the same injection pattern either over or under impregnates the gas passing the injection nozzle so that the first increment of combustible mixture reaching plug 16 fails to ignite.

However, this difficulty can be overcome by correlating the injection rate and pattern with the new gas velocity. For example, a 120° shroud operates satisfactorily with a properly correlated injection rate and pattern.

While certain figures for circumferential extent and positioning of the shroud on the intake valve have been given above, they are to be understood to be by way of example and not by way of limitation. The swirl of the induced gas can also be secured by arranging the gas inlet passage so as to discharge generally tangential to the combustion space in place of the shrouded valve construction illustrated.

In order to most efficiently effect the desired reaction between the oxygen and the hydrocarbon in the combustion space at a high energy level and to more completeness, and also provide maximum power on each cycle, the injection pattern is designed to uniformly impregnate the oxygen in its swirling movement. This requires a greater proportion of hydrocarbon toward the periphery of the combustion space with progressively lesser proportions toward the center. Such uniform impregnation is preferably accomplished in the construction shown by arranging the fan-shaped injection pattern to one side of the combustion space, so that the outer edge of the pattern is close to but does not impinge directly against the cylinder wall, while the inner edge of the pattern is offset from the center of the combustion space. The expansion of the reaction products then causes sufficient movement of the hydrocarbon, whether initially liquid or in the form of gas, toward the center of the combustion chamber or space to effect the desired impregnation of oxygen in this region.

As hereinbefore stated the rate of hydrocarbon injection and the injection pattern are coordinated with the velocity of the oxygen swirl so that any portion of the swirling oxygen which is impregnated and caused to react on each cycle with the hydrocarbon receives a regulated amount of hydrocarbon to produce an atomic O/C ratio within the reaction limits in the production of the desired synthesis gas, the gas usually desired being in the approximate proportions of 1 mol of carbon monoxide to 2 mols of hydrogen. Normally, the rate of hydrocarbon injection is set to give an atomic O/C ratio of about 1. For the best yields, an O/C ratio of 1 to 1.3 is preferred. It will be appreciated that proper correlation of the directional flow of oxygen with the rate of injection and injection pattern in this method of operation is an important consideration, since the process depends upon the rapid formation of a reactible mixture and its reaction substantially as rapidly as formed. Consequently, the customary non-directional or turbulent movement of oxygen within the combustion space, which is not equipped with the means for creating swirling, is ineffective for obtaining the no-knock operation with a fixed locus of fuel injection.

The reaction products produced on each cycle are expanded on the power stroke and discharged on the exhaust stroke in the customary four-cycle operation. The cycle is then repeated in the manner described.

Fig. 3 shows a modification wherein a standard CFR engine having a 3¼ inch bore single cylinder is modified by installing an injection nozzle 20' so as to direct the hydrocarbon or reactant in a generally tangential direction of the combustion space, as shown at 42. Spark plug 16' is positioned with its electrodes at substantially the periphery of the combustion space, the included angle 29' between the radii intersecting the tip of nozzle 20' and the center of plug 16' being approximately 45°.

The engine is equipped with the usual exhaust valve 15' and intake valve 14', the latter having a 180° shroud 34' positioned with the ends of the shroud substantially on a radius of the combustion space to impart a swirling movement of the air within the combustion space as indicated by arrows 33'. The proportioning of the valves as to size and location is that customarily employed in a 3¼ inch bore cylinder. It will be understood that in the showing made herein, the different elements are shown diagrammatically and do not necessarily show the proportioning of the valves as to size and location. Ordinarily the valves are located with their centers lying on the diameter of the cylinder and are usually of larger size in relation to the cylinder diameter shown in the drawings.

In the modification shown in Fig. 3 which is particularly designed for the use of liquid hydrocarbons, the injection equipment is such as to produce a penetrating core of atomized fuel particles 43 on the inner side toward the center of the combustion chamber with a mist of very finely divided atomized particles at the outer side adjacent the cylinder wall. The surrounding mist vaporizes rapidly and mixes with adjacent swirling oxygen, which latter deflects a portion of the mixture thus formed and indicated at 45 toward the electrodes of plug 16'. The plug is thus positioned within the surrounding core of combustible mixture but is out of contact with any injected particles. The operation of this modification is similar to that previously described in that the spark plug 16' is synchronized with the injection advance so as to fire the first increment of combustible mixture as it reaches the plug, thus initiating combustion and establishing reaction front 38'.

In the operation of this modification, it has been found that uniform and finely divided atomization across the entire injection pattern is not essential in obtaining knock-free operation, although the reaction efficiency appears to be somewhat impaired. Having initiated and established the reaction front 38', the additional hydrocarbon injected toward the reaction front mixes with additional swirling oxygen and reacts therewith substantially as rapidly as a reacting mixture is formed. It is probable that the so-called penetrating core is in actual operation largely non-existent in the combustion space or evident only as a streak or zone of richer mixture. In any event, the desired no-knock and carbon-free operation is obtained with hydrocarbons less than 0 and more than 100 octane using compression ratios up to 10:1 and manifold pressures up to 112 inches of mercury absolute.

In the modifications described above employing a directed movement of oxygen or oxygen swirl with a fixed locus of swirl, the oxygen swirl has several functions. It removes the reaction products from reaction fronts 38 and 38' as fast as formed so that they are replaced by fresh reactible mixtures and burning of such mixtures is accomplished without objectionable dilution of the reaction products. The directed movement of oxygen also brings fresh quantities of oxygen into the fuel impregnation zone to establish the uniform impregnation so that a portion of the oxygen is consumed on each cycle. The reaction is therefore conducted with high efficiency throughout the full period of injection on each cycle.

In the forms of the invention shown in Figures 1 and 3 where the spark is close to the injection nozzle tip and the tangential direction of injection is such as to bring an edge of the injection pattern closely adjacent the plug electrodes, the penetrative force of the jet is sufficient to carry the fuel to the vicinity of the spark plug; and the rapidly formed combustible mixture along the edge of the injection pattern diffuses outwardly into contact with the electrodes of the plug. However, the oxygen swirl can be utilized to blow combustible or reactible mixture into contact with the spark electrodes to insure ignition, thereby avoiding direct impingement of liquid fuel on these electrodes when a liquid hydrocarbon is used which might result in misfiring and even damping out of the plug.

While in the preferred embodiments above described, the hydrocarbon is injected tangentially in the direction of oxygen swirl, this is not essential. For example, the hydrocarbon may be injected radially or across the oxygen swirl, or may be injected against the oxygen swirl. Such modifications require a proper correlation of the hydrocarbon injection rate and its pattern with the velocity of the oxygen swirl, the cylinder diameter, and the relative positions of the injection nozzle and spark plug, in accordance with the general principles already described. Thus, in these various modifications, the oxygen swirl is utilized to blow combustible mixtures into contact with the plug electrodes while avoiding direct impingement of hydrocarbon particles thereon; and the injection advance is coordinated with the spark advance so that the first increment of injected hydrocarbon is fired as the resulting combustion mixture reaches the electrodes. The injection pattern is also modified to secure the desired uniform impregnation of the swirling oxygen in accordance with the relative location of the nozzle and its direction of injection, and the hydrocarbon is injected in a narrow zone in advance of the reaction front in its direction of relative movement with respect to the oxygen swirl.

It has been proposed to inject atomized liquid hydrocarbon directly against the electrodes of an ignition device to produce a high intensity arc which remains on for the full period of injection. In this prior arrangement, an arc of high tension and high energy similar to that used in nitrogen fixation furnaces is required to accomplish the stated purpose of combustion of unvaporized hydrocarbon particles. The present invention is distinguished by the avoidance of direct impingement of unvaporized fuel particles in the case of a liquid hydrocarbon or an excessively rich mixture of hydrocarbon gas in the case of initially gaseous hydrocarbon on the electrodes of the spark plug, by the ability to use a conventional automotive ignition system producing the customary spark of comparatively lower intensity and short duration sufficient to ignite the reactive mixture which first contacts the electrodes, and by the use of directional movement of the oxygen with respect to the hydrocarbon during the period of injection and combustion.

An important feature of the present invention is the proper synchronization of the spark advance with the injection advance to secure ignition of the first increment of injected hydrocarbon or rather the mixture formed therefrom substantially as soon as that mixture has been formed, which latter is then present at and in contact with the electrodes of the spark. Proper synchronization requires that a spark of igniting intensity be available at the time this first increment of reactible mixture reaches the spark plug. The timing of the beginning of the spark in relationship to the timing of the beginning of injection to accomplish this objective depends on:

(1) The time required for the hydrocarbon to travel from the injector nozzle to the spark which in turn depends on the velocity of gas swirl and/or the spray velocity as produced by the injector and the included angle between the spray nozzle and the spray in relationship to the cylinder diameter which determines the absolute distance the hydrocarbon must travel between the nozzle and spark plug.

(2) The time interval during which a spark of igniting potency remains at the spark plug electrodes, which in turn depends on the characteristics of the ignition circuit and the conditions at the spark gap.

The relationships included in (1) above have already been discussed. The variable under (2) above involves a consideration of the length of time a spark of igniting potency is used on each cycle, namely, whether it is substantially instantaneous, or of a relatively short duration in the order of 5–20 crank angle degrees such as may be produced with conventional ignition circuits, or whether it is of still longer duration which may approximate the time interval of the reaction phase.

While the present invention can be practiced with a substantially instantaneous spark, this requires a critical coordination of the spark advance with the injection advance. For example, in the construction shown in Fig. 3, employing injection in the direction of air swirl, the instantaneous spark should occur at the plug electrodes at an instant within a range of about 4–10° and preferably about 6° of crank angle movement following the start of hydrocarbon injection. Where the injection is across or against the air swirl, the spark advance is usually in the range of 10–20° after the injection advance for the instantaneous spark.

However, it has been found that the conventional magneto or coil ignition system has a spark duration of about 5–30 crank angle degrees at an engine speed of 1800 R. P. M. It has further been found that during this period the spark is not always of sufficient intensity to cause the mixture to react, the spark tolerance for a particular combustion chamber varying with the characteristics and the conditions at the spark gap employed. For example, with the construction shown in Fig. 3 and employing an ignition circuit of the magneto type having a spark duration of about 6 crank angle degrees with a plug gap of 0.005 inch, and decreasing to a spark duration of about 4° with a plug gap of 0.055 inch, the engine operates satisfactorily without knocking and without substantial carbon formation with the following setting of spark advance using a 42° injection advance throughout the runs. With a spark duration of 6°, satisfactory operation is secured with an ignition advance setting of 40–33° BTC, thus giving a spark tolerance of about 7°. With a spark duration of about 4°, successful operation is secured with a spark advance setting varying between 37° and 33° BTC, providing a spark tolerance of about 4°.

In operation with another engine constructed similarly to Fig. 3, except that the spark plug center is moved in about ½ inch from the circumference of the combustion space and the included angle between radii intersecting the injection nozzle tip and the spark plug center is 30°, a different magneto ignition circuit may be employed having a much longer spark duration than in the previous example. Using a 60° injection advance throughout the series of runs, satisfactory knock-free operation can be secured with an ignition advance of 70°–54° BTC for a spark duration of 28°, giving a spark tolerance of about 16°. With a larger plug gap providing a spark duration of about 24°, the operative spark advance range can be 70°–60° BTC, providing a spark tolerance of about 10°. With a still larger plug gap providing a spark duration of about 22°, the operative spark advance range can be 63°–54°, giving a spark tolerance at this setting of about 9°.

The above examples are given to illustrate that conventional automotive ignition circuits of the magneto type can be employed satisfactorily and will afford generally a spark tolerance of about 5°–15°, depending upon the characteristics of the circuit and the size of the plug gap. Also, this is true of conventional ignition circuits of the coil and breaker type. Moreover, it is to be noted that with the conventional ignition system and the given engine construction described immediately above, the maximum spark advance could be set to precede the start of injection by as much as 10°, while the full retard setting of the spark advance could be set as much as 6° after the start of fuel injection, depending upon the size of the spark plug gap. In the above examples, the size of the plug gap is purposely varied simply as a convenient means of controlling and altering the duration of the spark. As a practical matter, the size of the spark gap in commercial engines may be set within rather close limits in accordance with conventional practice in the automotive ignition art, and need not be varied to any substantial extent. Therefore, the spark duration for a given ignition circuit will be fixed by the characteristics of that circuit, and the size of the spark gap need not be a variable. Consequently, the spark tolerance for a given engine construction and a given ignition circuit will be fixed; and the maximum spark advance and spark retard positions for the given setup can be accurately determined and the spark setting made accordingly within these limits. It will be obvious from the above that, in general, the spark advance for the conventional automotive ignition system will be set in accordance with the present invention to approximately correspond with the injection advance or very shortly thereafter. The proper setting for any particular ignition circuit for a given engine construction can be readily determined by those skilled in the art in accordance with the principles set forth above, bearing in mind that a spark of ignitible intensity should be present at the plug electrodes at the time the first increment of injected fuel in the form of a combustible mixture reaches the plug electrodes, or not more than about 5–15 crank angle degrees thereafter such that insufficient combustible mixture has accumulated in the combustion space at the time of ignition to permit knocking to occur. Investigation of various ignition circuits for this method of operation has indicated that a relatively high current spark is preferable.

While the conventional automotive ignition circuit functions very satisfactorily and provides a spark tolerance which removes the extreme criticality for exact setting of the spark advance in relation to the injection advance, it will be readily appreciated that a continuous spark of fairly long duration can be employed, if desired. While the continuous spark can be left on during the entire engine cycle, utilizing for example a continuous type of spark employed in fuel burner systems, it is obvious that this arrangement can be easily synchronized with engine operation so that the spark is on only for a selected period of the reaction phase, and can be turned off during the balance of the cycle. Wherever the expressions "spark ignition" and "ignited by spark" or similar expressions appear in the description and claims, it is to be understood that these expressions are intended to include any equivalent arrangement such as a glow-wire for igniting the localized combustible mixture.

While the operations described above, employing orderly and directed movement of one of the reactants within the combustion space past a fixed locus of injection of the other reactant, are considered preferred embodiments for carrying out the no-knock method of operation of the present invention, it is to be understood that the invention is not limited thereto. In order to obtain the desired relative movement between the reactant taken in the intake and the injected reactant during the combustion phase, the modifications of Figures 4 and 5 may be used, wherein the locus of fuel injection is progressively moved in an orderly manner throughout the combustion space to bring different increments of the injected reactant into mixture with relatively stationary or non-directed turbulent intake gas.

Figure 4 shows a modification in which the fuel injection system and other appurtenances of the engine may be the same as for Figures 1–3, described above, except that in this case the injection nozzle 50 is positioned centrally of the cylinder or combustion space. One reactant is introduced through a conventional intake valve 51 which may be a simple poppet valve, not provided with a shroud or other means for producing swirl of the reactant. The injection nozzle is provided with a plurality of circumferentially arranged ports through which the injected reactant is injected in narrow bands or jets in spaced order and in sequence throughout the period of injection.

As indicated, the injected reactant, hydrocarbon for example, is first injected into a narrow or localized zone 52, where it flash vaporizes, if originally a liquid, and mixes with the other reactant in that particular zone to form a reactible mixture adjacent the electrodes of the spark plug 53. This is immediately fired by the spark plug establishing reaction fronts on opposite sides of the narrow band, as indicated at 54 and 55. Immediately thereafter a second quantity of hydrocarbon is injected from the next adjacent port to form an adjacent body of reactible mixture 56 which is immediately ignited by the reaction front 54. In rapid and regular sequence, hydrocarbon is injected from the additional spaced ports into narrow adjacent zones proceeding around the combustion space, so that the reaction front travels in the direction of the arrow 57. It is thus seen that hydrocarbon is injected in narrow bands immediately in advance of the reaction front, and the resulting reactible mixture is immediately consumed by combustion before the hydrocarbon has an opportunity to mix with oxygen other than in its localized zone. Consequently, the reactible mixture in each of the series of localized zones is at all times surrounded and cushioned by incombustible gas, either oxygen or products of reaction. Here again, the formation of trapped end gas consisting of reactible mixture is entirely avoided so that the problem of knock and preignition is substantially eliminated.

The amount of hydrocarbon injected can be regulated by the number of ports throughout the circumference of the injection nozzle through which hydrocarbon is injected on each cycle. The upper limit is, of course, injection through all of the ports. Any conventional valve control for circumferentially arranged ports can be employed to regulate the hydrocarbon injection, such, for example, as a cam-operated sleeve valve sliding over a circumferentially arranged series of ports which are also spaced in the direction of sliding of the sleeve, in the manner of a spiral staircase. Control of the amount of hydrocarbon injected on each cycle is secured by regulation of the length of sliding travel of the sleeve valve, and control of the time of hydrocarbon injection or injection advance is secured by regulation of the cam setting in relation to the engine stroke, all in conventional manner. Following expansion of the combustion gases, the products of reaction are discharged through the exhaust valve 58 and the cycle is repeated.

Instead of having the reaction front travel in only one direction about the combustion space in the manner described above, the two separate reaction fronts 54 and 55 can both be caused to travel in opposite directions. This is accomplished by controlled injection of hydrocarbon from pairs of ports arranged on opposite sides of the initial localized combustion zone 52, or in advance of the two reaction fronts as they move about the combustion space. Thus, hydrocarbon is first injected into the localized zone 52. Immediately thereafter, two jets of hydrocarbon are injected simultaneously, or in extremely close sequence, into the zones 56 and 59, and this sequence of injection is continued while the two reaction fronts move in opposite directions about the combustion space until the oxygen is substantially all consumed. In this case, the hydrocarbon injection ports of the nozzle are arranged to descend in two series of spiral staircases extending in opposite directions from the initial port, and under the control of the sliding sleeve valve previously described.

Figure 5 shows still another modification in which the hydrocarbon nozzle 60 is positioned at one side of the cylinder and is provided with a plurality of spaced ports for injecting localized hydrocarbon streams in sequence over spaced portions of the combustion space. Hydrocarbon is first injected into the zone 61 where it is immediately ignited by spark plug 62. Hydrocarbon is then immediately injected from the second port into the localized zone 63 in advance of the reaction front 64 established by combustion in zone 61. Thereafter, hydrocarbon is injected in rapid sequence from the other ports, causing localized combustion throughout the other segments of the combustion space in order, and resulting in movement of the reaction front about the hydrocarbon nozzle as an axis in the direction of the arrow 65 until all the oxygen has been consumed. If desired, a second spark plug 67 can be employed for simultaneously, or substantially simultaneously, initiating combustion in localized zone 68 with the combustion in zone 61. The reaction fronts 64 and 69 then rotate about the hydrocarbon nozzle as an axis toward each other. The sequence of hydrocarbon injection from the spaced ports of the nozzle can be controlled in any conventional manner, such as by the arrangement of sleeve valve described above in connection with Fig. 4. In both Figures 4 and 5 the quantity of hydrocarbon injected can be regulated by the setting of the cam through any suitable external control, and the injection advance can be regulated by the setting of the cam through suitable external or automatic control, as is well understood.

Fig. 6 illustrates a modification wherein only a portion of one of the reactants such as the hydrocarbon is injected through nozzle 20, the reaction with the swirling oxygen-containing gas proceeding in the same manner as described in connection with the drawings of Fig. 2 to set up a reaction front 38. In advance of the reaction front or clockwise as viewed in Fig. 6, a second injection nozzle 20a is provided for the injection of the remaining portion of the hydrocarbon, the hydrocarbon thus being injected into the reaction front and disseminated throughout the reaction products from the initial reaction of the oxygen with the first portion of hydrocarbon, as distinguished from the operation of Fig. 2 wherein the so-called primary reaction between oxygen and a hydrocarbon such as methane and the so-called secondary reaction between the reaction products and additional hydrocarbon takes place more or less in the same zone. In the arrangement shown in Fig. 6, the secondary reaction between the hydrocarbon injected through nozzle 20a and the reaction products takes place in a different zone.

The combined so-called primary reaction and the secondary reactions in both cases can be summarized as follows:

$$CH_4 + \tfrac{1}{2}O_2 \qquad CO + 2H_2$$

In such modifications as that shown in Fig. 2, such reactions apparently take place substantially together whereas in the modification shown in Fig. 6, they are effected in two different zones. Preferably about 20 to 30 per cent of the hydrocarbon such as natural gas is injected through nozzle 20, the remainder of the natural gas being injected through nozzle 20a.

Fig. 7 illustrates a further modification based on the arrangement shown in Fig. 1 wherein the reactant introduced through intake valve 14' through pump 19' and preheater 18' includes an oxygen-containing gas preferably containing 90 to 99 per cent oxygen and a hydrocarbon such as natural gas, the proportions of the mix being such that the resultant mixture is not susceptible to preignition or explosion under the conditions encountered in the cylinder. The remaining oxygen is introduced through line 21', compressor 22' and preheater 23' through valve 24' to an injection nozzle 20. In this modification, the oxygen introduced through nozzle 20 is in an amount to set up a final mixture capable of having its reaction initiated by spark 16, the remaining characteristics of operation being as described in connection with Figs. 1 and 2. This modification possesses the advantage that the mixture of hydrocarbon and oxygen can be brought to a relatively high degree of preheat, the resulting reactions correspondingly taking place at a higher energy level and hence to a more complete stage.

While the invention has been described as applied to four-cycle operation, it is to be understood that it is applicable as well to two-cycle operation; in fact the process of the invention lends itself particularly well to two-cycle operation because there is no necessity for preforming the fuel mixture, and this enables the suction stroke of four-cycle operation to be easily eliminated. For example, a two-cycle engine may be equipped with intake ports for directional introduction of one reactant just above the bottom of piston travel whereby a swirling movement of the reactant can be developed, as already explained in connection with Figs. 1–3. Poppet exhaust valves may be provided at the opposite end of the cylinder for discharge of the product gas. However, it is to be understood that any conventional construction or design of two-cycle engine can be readily converted to such method of operation by suitable and simple alteration to incorporate the principles of controlled reactant injection in a localized zone or zones immediately in advance of the reaction front or fronts as described above.

To enable better control of the character of the product gas, it is preferred to control the reactant entering through the intake valve, such control coupled with a corresponding control of the injected reactant enabling the proportion of the initial reactions to be accurately controlled. In most instances for the preparation of synthesis gas for the synthesis of hydrocarbons, oxygenated compounds and the like, it is preferred to use oxygen in an amount in excess of about 25% of that stoichiometrically required to react with a hydrocarbon such as methane to finally produce a product consisting essentially of carbon monoxide and hydrogen in a mol proportion of about 1:2.

The generation of power as an adjunct to the generation of the desired gas mixture such as synthesis gas is of decided advantage in that the power requirements for the gas generation, including the power required for initially separating the oxygen from air or other sources, and the power required for compressing the reactants, and the power requirements for other phases of the synthesis process can be supplied by the engine. A typical set-up involving an internal combustion engine in such a process wherein the power requirements are supplied by the engine is disclosed in the co-pending application of du Bois Eastman and E. M. Barber, Serial No. 722,742, filed January 17, 1947.

Obviously many modifications and variations of the invention as above set forth may be made without departing from the spirit and scope thereof and only such limitations should be imposed as are indicated in the appended claims.

I claim:

1. The method of preparing a mixture of hydrogen and carbon monoxide by the partial combustion of reactants comprising an oxygen-containing gas and a hydrocarbon in an internal combustion engine having a power cylinder providing a combustion space, which comprises introducing one of the said reactants into the said power cylinder combustion space, compressing said reactant therein, injecting prior to top dead center of the compression stroke, the second reactant into a localized portion of said compressed first reactant within the said combustion space at a temperature and pressure such that at least a portion thereof forms with the localized portion of the first reactant a combustible mixture with only a short travel of the second reactant from the locus of injection, immediately electrically igniting the localized first increment of combustible hydrocarbon-oxygen mixture as soon as formed and before sufficient of said second reactant has been injected and has had an opportunity to disseminate more widely throughout the combustion space, whereby the localized combustible hydrocarbon-oxygen mixture burns and establishes a flame front traveling with respect to the first reactant within the combustion space and which is confined on the rear side by resulting reaction products, and on the front side by a layer of incombustible gas, and continuing the injection of the second reactant into a narrow zone of the combustion space containing compressed first reactant shortly in advance of the flame front in its direction of movement, while moving the compressed first reactant and locus of second reactant injection relative to each other in an orderly manner to progressively form additional localized portions of combustible hydrocarbon-oxygen mixture, immediately in advance of the traveling flame front so that they are ignited by said flame front and burned substantially as soon as formed, while maintaining the said confining layer of combustion products at the rear and the confining layer of incombustible gas at the front, regulating the relative rate of introduction of said reactants to the internal combustion engine such that the atomic ratio of oxygen to carbon in the total feed is in the range of about 1:1 to about 1.3:1, so that the hydrocarbon is converted substantially completely into hydrogen and carbon monoxide, and recovering the products of reaction so produced.

2. A method according to claim 1 wherein the oxygen-containing gas is a high purity stream containing at least about 90 per cent oxygen.

3. The method according to claim 1 wherein said first reactant is a high purity oxygen stream containing about 90 to 99 per cent oxygen.

RAYMOND J. RUBLE.

REFERENCES CITED

The following references are of record in the file of this patent:

UNITED STATES PATENTS

| Number | Name | Date |
|---|---|---|
| 1,107,581 | Brownlee et al. | Aug. 18, 1914 |
| 1,107,582 | Brownlee et al. | Aug. 18, 1914 |
| 1,305,579 | Wolfard | June 3, 1919 |

OTHER REFERENCES

Richardson, Heating Fuels for Injection Engines, The Pennsylvania State College Bulletin, The School of Engineering, Technical Bulletin No. 16, Proceedings of the Sixth Oil Power Conference.